(12) United States Patent
Ferguson

(10) Patent No.: US 10,349,641 B2
(45) Date of Patent: Jul. 16, 2019

(54) FISHING TRAY RUNNER

(71) Applicant: Kent Ferguson, Grand Bay-Westfield (CA)

(72) Inventor: Kent Ferguson, Grand Bay-Westfield (CA)

(*) Notice: Subject to any disclaimer, the term of this patent is extended or adjusted under 35 U.S.C. 154(b) by 239 days.

(21) Appl. No.: 15/371,417

(22) Filed: Dec. 7, 2016

(65) Prior Publication Data

US 2017/0196208 A1 Jul. 13, 2017

(30) Foreign Application Priority Data

Jan. 12, 2016 (CA) ..................................... 2917309

(51) Int. Cl.
*A01K 69/06* (2006.01)
*A01K 69/08* (2006.01)

(52) U.S. Cl.
CPC .............. *A01K 69/06* (2013.01); *A01K 69/08* (2013.01)

(58) Field of Classification Search
CPC ................................ A01K 69/06; A01K 69/08
USPC ......................................................... 43/100
See application file for complete search history.

(56) References Cited

U.S. PATENT DOCUMENTS

| | | | | |
|---|---|---|---|---|
| 878,820 A * | 2/1908 | Murdoch | ............... | A01M 23/18 43/100 |
| 2,530,449 A * | 11/1950 | Bush | ...................... | A01K 69/08 43/102 |
| 4,147,130 A * | 4/1979 | Goguel | ................... | A01K 61/60 119/223 |
| 4,486,973 A * | 12/1984 | Faucillon | ............... | A01K 69/08 43/100 |
| 4,982,525 A * | 1/1991 | Miller | .................... | A01K 69/10 43/103 |
| 5,325,623 A | 7/1994 | Sakuraoka et al. | | |
| D365,135 S * | 12/1995 | Elliott | ......................... | D22/121 |
| 5,839,220 A * | 11/1998 | Wass | ...................... | A01K 69/10 43/105 |
| 5,943,814 A * | 8/1999 | Bartlett, Jr. | ............ | A01K 69/06 43/104 |
| 6,739,924 B1 * | 5/2004 | Groen | .................... | B63B 22/04 441/2 |
| 7,533,486 B2 * | 5/2009 | Ribeiro De Matos | ...................... | A01K 69/10 43/100 |
| 7,874,098 B2 * | 1/2011 | Vickery | .............. | A01M 25/004 43/131 |
| 9,781,910 B1 * | 10/2017 | Burrell | ................... | A01K 69/08 |
| 2016/0165863 A1 * | 6/2016 | Anderson | .............. | A01K 69/08 43/105 |

FOREIGN PATENT DOCUMENTS

| CA | 572575 A | 10/1963 |
|---|---|---|
| CA | 2253051 A1 | 5/2000 |
| CA | 2621419 A1 | 8/2008 |

* cited by examiner

*Primary Examiner* — Christopher P Ellis
(74) *Attorney, Agent, or Firm* — Polson Intellectual Property Law P.C.; Christopher Sylvain; Margaret Polson

(57) ABSTRACT

A fishing trap runner and fishing trap incorporating the runner, the runner comprising a rubber casing having a core. The core, which may be sectional, provides weight so that the runner can serve as ballast for the fishing trap. The rubber casing protects the core from damaging the trap or fishing equipment and, if the core is sealed by the casing, protects or limits the core from water damage.

11 Claims, 3 Drawing Sheets

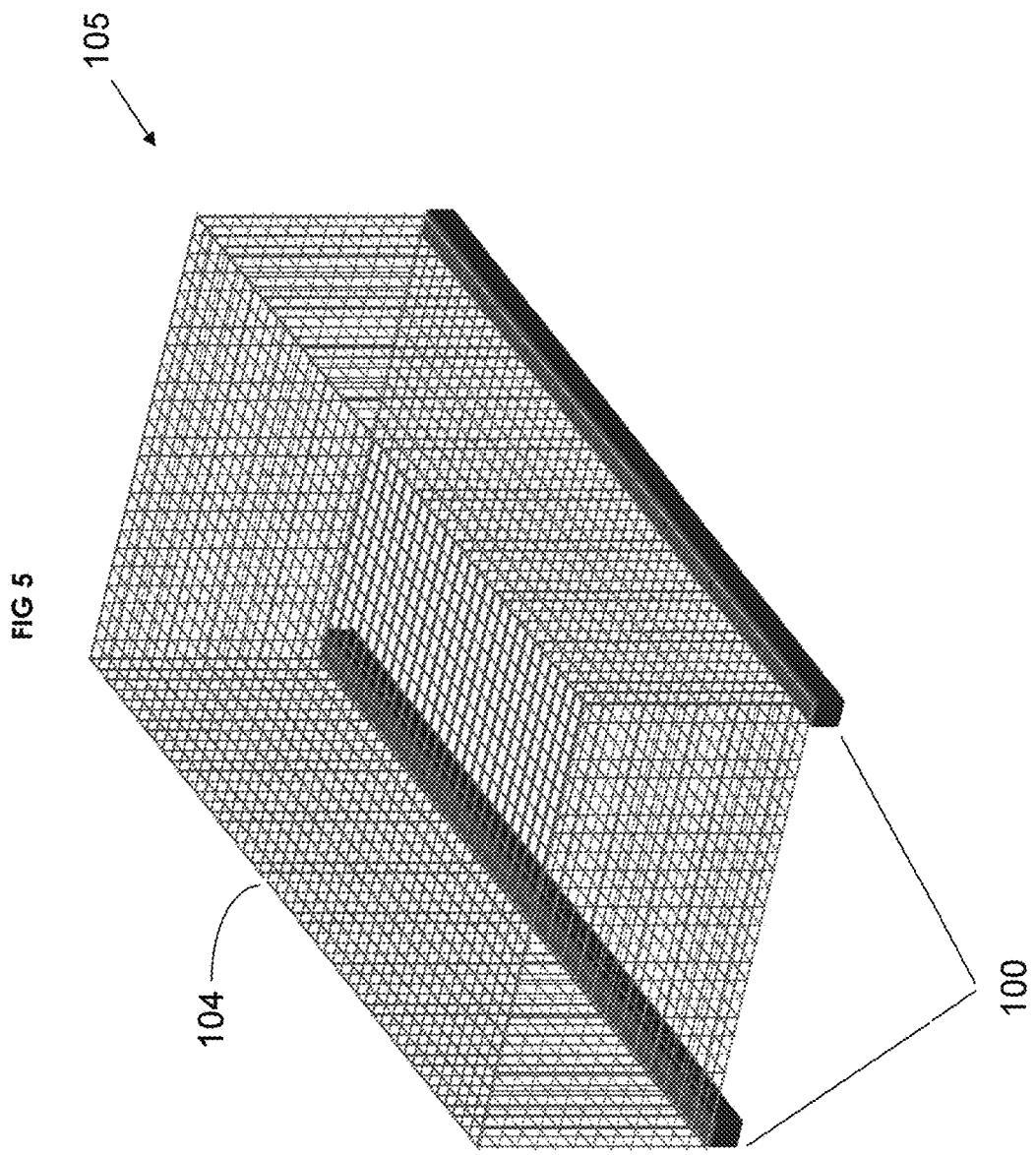

FISHING TRAY RUNNER

TECHNICAL FIELD

The invention is directed to runners for fishing traps, such as shellfish, lobster, crustaceans, etc. and to fishing traps incorporating such runners.

BACKGROUND

Fishing traps are placed on the beds of lakes, oceans, and other bodies of water (sea bed) to capture and collect fish, shellfish, crustaceans, molluscs, bivalves, or other fishing animals (hereinafter "fish") for harvest as seafood. A standard fishing trap is designed to be reused to accept bait, be placed on the sea bed to trap fish, and then retrieved to harvest the fish from the trap. As these traps are intended to be reused often, it is important that they are resilient to both being submerged in water for long periods as well as during their use, handling, and storage. Generally, fishing traps use wooden runners attached to the bottom of the trap to protect the trap from damage caused while the trap is resting on the seabed, being stored, or during the trap's deployment and recovery from a fishing vessel. These runners provide some structural support while helping to protect the frame of the trap from impacts with seabed obstacles, other traps, and fishing equipment. However, wooden runners can become damaged, waterlogged, or rotten over time.

Further, as such traps are designed to rest on the seabed, the traps must have either sufficient weight or additional ballast to keep the trap on the seabed, right side up, until it is retrieved. This is often done by adding bricks or other ballast sources inside the traps. However, during retrieval of the traps, these ballast sources can shift resulting in injury to the fish in the Several inventions have been proposed to address these concerns. Canadian Patent No. 2,253,051 to Bartlett discloses a wire mesh lobster trap which has poured concrete runners formed around the lower portions of the trap frame. These concrete runners would provide ballast for the trap and be resilient to provide structural support to the trap. However, the use of concrete runners can result in damage to boat surfaces and fishing equipment during the deployment and retrieval of the traps. In addition, forming the concrete runners directly around the trap frame means that the runner cannot be readily removed or replaced if the trap requires maintenance or repairs.

U.S. Pat. No. 4,486,973 to Faucillion discloses a shellfish trap comprising an integrated plastic base with indentations to receive poured concrete while the plastic outer shell protects against damage. However, the system requires the trap to be specifically designed to fit the plastic base as one unit, is relatively complex to manufacture and does not provide for runners or ballast for use in other traps in particular existing conventional traps.

There is clearly a need for a fishing trap runner which is long lasting, resistant to damage, less likely to cause damage to other traps and equipment, relatively easy to install or remove, and especially able to provide ballast to the trap.

SUMMARY OF THE INVENTION

In a first embodiment, the invention provides a runner for a fishing trap wherein the runner is to provide ballast for the trap. The runner comprises a rubber casing having a core, the density of the core being higher than the density of the casing. The runner is also configured for attachment, preferably releasable attachment, to an exterior bottom of the fishing trap.

The core may comprise a single section, or a plurality of sections such as parallel longitudinal sections. The core preferably comprises a heavy metal or dense rubber material. If the core is a heavy metal material, such is preferably iron, steel or lead, but most preferably steel. A heavy metal core is preferably completely sealed in the casing, thereby providing a water-tight seal for the core. If the core is comprised of a dense rubber, i.e. in contrast to the lighter density rubber of the casing, such may be partially (non-watertight) or completely (watertight) sealed in the casing.

The runner may also comprise markings, pre-fabricated divots (indentations) or holes to locate or receive fasteners for attachment to an exterior trap bottom.

In another embodiment, the invention provides a fishing trap, preferably a lobster or crab fishing trap. The fishing trap comprises an interior for holding bait and trapping the fish, and one or more runners, preferably two runners, as described above. The runners have weight to act as ballast and are attached to the exterior bottom of the trap preferably with fasteners such as screws or nails.

BRIEF DESCRIPTION OF THE DRAWINGS

In drawings which show preferred embodiments of the invention:

FIG. 5 is a perspective view of a fishing trap incorporating two of the runners depicted in FIG. 1.

DETAILED DESCRIPTION

Figure 1:
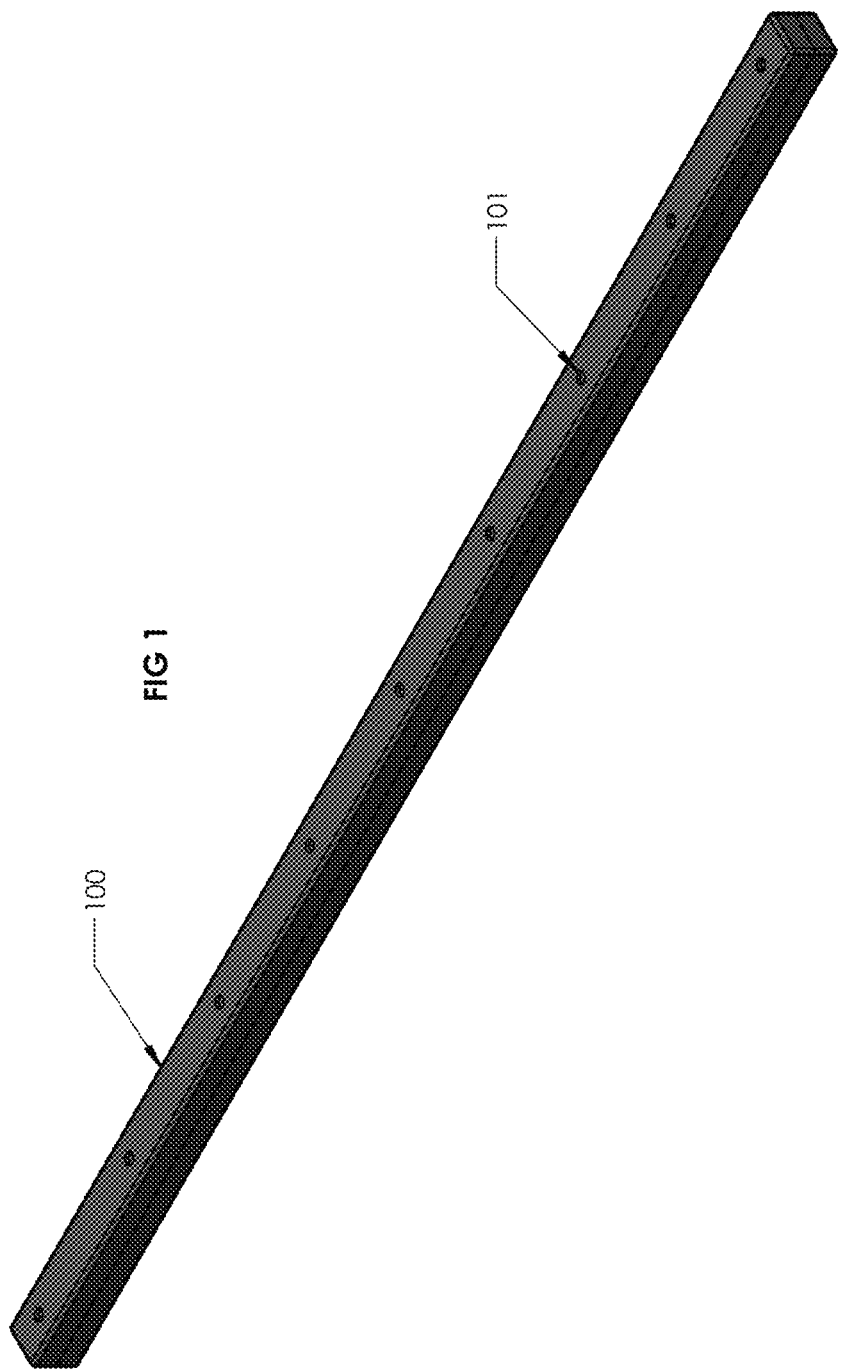
FIG. 1 is a perspective view of one embodiment of a fishing trap runner according to the invention.
Figure 2:
FIG. 2 is a top view of the runner shown in FIG. 1.
Figure 3:
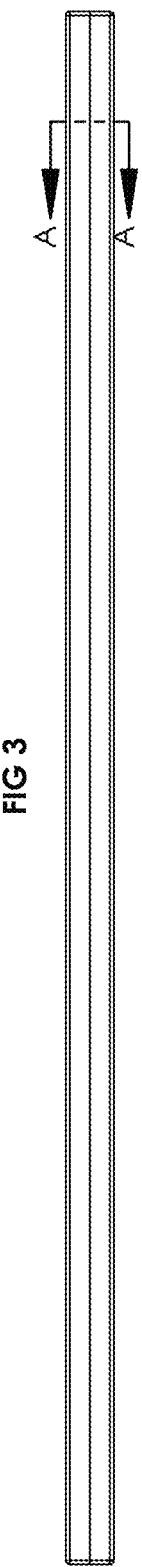
FIG. 3 is a side view of the runner shown in FIG. 1.
Figure 4:
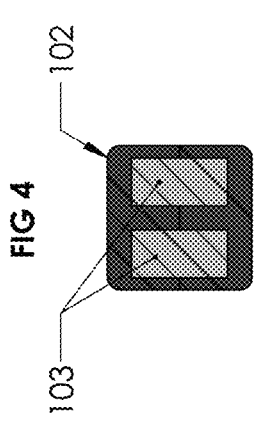
FIG. 4 is a cross section view of the runner of FIG. 1, along the line shown in FIG. 3.

As in the preferred embodiment depicted in FIG. 1, the runner (100) preferably has an elongate rectangular shape designed to run the length of a fishing trap. While the runner (100) can be modified for fishing traps of any dimension, generally, a runner (100) preferably will be between 20" and 60", or 40" to 55" in length; preferably between 1" and 3" wide; and preferably approximately 1" in height. As best shown in FIG. 4, the runner (100) comprises an outer rubber casing (102) enclosing a core (103) preferably having two longitudinal sections. A core (103) having one section, or three or more sections is also suitable depending on preferences as to weight, cost, manufacturing.

Each section of the core (103) is preferably formed from a dense rubber or heavy metal, such as iron or steel, but other materials of similar weight and integrity may be employed as would be known to one skilled in the art. The core (103) provides sufficient weight to the runner (100) to allow for the runner (100) to also serve as ballast for the trap. Preferably, each runner (100) will weigh between 5 and 20 pounds, depending upon the length of the runner (100). As a specific example, a 48" long runner (100) may weigh approximately 14 pounds, which is a preferred length and weight for a conventional lobster trap.

The outer rubber casing (102) preferably fully surrounds the core (103) and thereby provides a deformable layer over the core which prevents the high density core (103) from directly impacting anything that may contact the runner, e.g. other traps, fishing equipment and handling facilities such as the fishing boat during use. Only the much less harmful casing, which has a lower density and preferably softer consistency compared to the core, would come into contact with other traps, equipment and facilities. The outer rubber casing (102) also preferably provides a watertight seal around the core (103), preventing exposure of the core to water thereby reducing the rate of decay of a metal core from rust. Although, when a different material such as high density rubber is selected for the core (103), completely encasing the core (103) to provide a watertight seal may not be required.

In making the runner (100), the outer rubber casing (102) is formed around the high density core (103) by conventional means, but preferably in a mold under heat and pressure in accordance with the selected casing and core materials. The rubber used to form the outer rubber casing (102) may be selected from a number of rubbers including, but not limited to: recycled rubber, natural rubber, synthetic rubber, or combinations thereof. These rubbers may incorporate different degrees of vulcanization.

In the preferred embodiment depicted in the drawings, the runner (100) also comprises a series of divots (indentations (101)) for directing the user in the placement of fasteners for attaching the runner (100) to a fishing trap. Markings or holes may be used instead of divots. The divots (101) facilitate the location of fasteners without impinging on a core of metal provided in sections, e.g. the fastener may be located between such sections. The placement of the divots (101) also allows for fasteners to be placed without risking damaging the seal around the core (103) which is formed by the casing (102). These divots (101) may be less useful, and not provided accordingly, for example if the material used for the core is dense rubber which allows for fasteners such as screws to be readily driven through the runner (100) at any location along the runner into the bottom of the trap. The runner (100) may be directly attached to the trap by screws, nuts and bolts, or other fasteners that would be readily understood by one skilled in the art.

As shown in FIG. 5, a fishing trap (105) may be provided with a trap enclosure (104) attached to two of the inventive runners (100) although one or more runners (100) may be used as preferred.

While the foregoing describes most preferred embodiments of the subject invention, a person skilled in the art will appreciate that variations of such embodiments will be feasible and still be within the scope of the teachings herein. Thus, the substitution of different materials (e.g. metals, plastic, adhesives etc.) for those specifically indicated may be expected to occur to such person, and variations in shapes and configurations of the different components involved may be made while sustaining the functions of components actually shown herein, such all being within the intended scope of the present invention.

The invention claimed is:

1. A runner for a fishing trap, wherein the runner is to provide ballast for the trap, the runner comprising a rubber casing having a core, the density of the core being higher than the density of the casing, wherein the casing completely encloses the core, and
wherein the runner is configured for attachment to an exterior bottom of the fishing trap.

2. The runner of claim 1, wherein the core is heavy metal or high density rubber.

3. The runner of claim 2 wherein the core is iron or steel and the casing provides a water-tight seal for the core.

4. The runner of claim 1, further comprising markings, divots or holes for locating or receiving fasteners to facilitate said attachment.

5. The runner of claim 1 wherein the fishing trap is a lobster or crab trap.

6. The runner of claim 1 wherein the core comprises a plurality of sections.

7. A fishing trap comprising:
an interior for holding bait and trapping fish; and
one or more runners, each runner having weight to act as ballast and comprising a rubber casing having a core, the density of the core being higher than the density of the casing; wherein the casing completely encloses the core, and
wherein each runner is attached to an exterior bottom of the trap.

8. The fishing trap of claim 7, wherein the core is heavy metal or high density rubber.

9. The fishing trap of claim 8, wherein the core is steel and the casing provides a water-tight seal for the core.

10. The fishing trap of claim 7, wherein each runner further comprises markings, divots or holes for fasteners attaching the runner to the exterior bottom of the trap.

11. The fishing trap of claim 7, wherein each runner extends substantially the length or width of the trap.

* * * * *